United States Patent
Matsuo et al.

(10) Patent No.: US 6,386,420 B2
(45) Date of Patent: *May 14, 2002

(54) APPARATUS FOR CONTINUOUSLY ROLLING STEEL BILLETS

(75) Inventors: Giichi Matsuo; Susumu Okawa, both of Yokohama; Koji Okushima, Kamakura, all of (JP)

(73) Assignee: NKK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/848,036

(22) Filed: May 3, 2001

Related U.S. Application Data

(62) Division of application No. 09/511,086, filed on Feb. 23, 2000, now Pat. No. 6,273,324, which is a division of application No. 08/876,651, filed on Jun. 16, 1997, now Pat. No. 6,089,441.

(30) Foreign Application Priority Data

Jun. 28, 1996 (JP) .............................. 8-168863
Jun. 28, 1996 (JP) .............................. 8-168866

(51) Int. Cl.[7] .............................................. B23K 37/00
(52) U.S. Cl. ........................................ 228/5.7; 228/49.1
(58) Field of Search ................................ 228/5.7, 49.1, 228/158, 125, 160, 4.1; 219/610, 617, 614, 655; 72/202

(56) References Cited

U.S. PATENT DOCUMENTS

| | | |
|---|---|---|
| 2,163,967 A | 6/1939 | Strawn et al. |
| 4,627,259 A | 12/1986 | Andersson et al. |
| 4,706,871 A | 11/1987 | Kajiwara et al. |
| 5,063,767 A | 11/1991 | Drummond |
| 5,098,191 A * | 3/1992 | Noguchi et al. |
| 5,121,873 A | 6/1992 | Sekiya et al. |
| 5,172,846 A | 12/1992 | Hayashi et al. |

(List continued on next page.)

FOREIGN PATENT DOCUMENTS

| | | |
|---|---|---|
| DE | 932 303 C | 8/1955 |
| DE | 28 36 338 A | 2/1980 |
| DE | 43 23 837 A1 | 1/1995 |
| GB | 765150 | 2/1957 |
| JP | 52-43754 | 4/1977 |
| JP | 57-11722 | 3/1982 |

OTHER PUBLICATIONS

Patent Abstracts of Japan, vol. 010, No. 025 (M–450), Jan. 31, 1986 and JP 60–184408 A (Sumitomo Kinzoku Kogyo KK), Sep. 19, 1985—Abstract.

(List continued on next page.)

Primary Examiner—Tom Dunn
Assistant Examiner—Jonathan Johnson
(74) Attorney, Agent, or Firm—Frishauf, Holtz, Goodman, Langer & Chick, P.C.

(57) ABSTRACT

A plurality of materials are rolled in an upstream stand. While the transfer speed of a succeeding material and the front end position thereof are detected, the transfer speed and the rear end position of a preceding material are detected by a measuring roll. The transfer speed of the succeeding material is controlled by adjusting at least the drive speed of the pinch rolls so that the front end of the succeeding material contacts the rear end of the preceding material at a specified position in a travelling welder. The rear end of the preceding material is joined with the front end of the succeeding material by flash-butt welding using the travelling welder to form a continuous material while letting the travelling welder move at a speed synchronous with the transfer speed of the continuous material. The welded portion on the continuous material is ground and/or cut to remove burrs therefrom. After removing the burrs, the continuous material is continuously rolled by a down-stream stand.

4 Claims, 3 Drawing Sheets

U.S. PATENT DOCUMENTS

| | | | |
|---|---|---|---|
| 5,323,951 A | 6/1994 | Takechi et al. |
| 5,396,050 A | 3/1995 | Ebihara et al. |
| 5,461,770 A | 10/1995 | Kimura et al. |
| 5,542,165 A | 8/1996 | Coassin et al. |
| 5,719,368 A | 2/1998 | Okushima et al. |
| 5,829,117 A | 11/1998 | Okawa et al. |
| 5,957,367 A | 9/1999 | Matsuo et al. |
| 6,041,993 A | 3/2000 | Matsuo et al. |

OTHER PUBLICATIONS

Patent Abstracts of Japan, vol. 012, No. 495 (M–780), Dec. 23, 1988 and JP 63–215313 A (Toshiba Corp), Sep. 7, 1988—Abstract.

Patent Abstracts of Japan, vol. 017, No. 212 (M–1402), Apr. 26, 1993 and JP 04–351210 A (Hitachi Ltd.), Dec. 7, 1992—Abstract.

Patent Abstracts of Japan, vol. 018, No. 079 (M–1557) Feb. 9, 1994 and JP 05–293511 A (Nippon Steel Corp.), Nov. 9, 1993—Abstract.

Stahl Und Eisen, vol. 78, No. 16, Aug. 7, 1958, pp. 1130–1132, XP002028327, Weidemann, H.: "Das Auswalsen 'Endlos' Zusammengeschweisster Knueppel" —Figures 2, 3.

Database WPI, Section Ch., Week 8645, Derwent Publications Ltd., London, GB; Class M21, AN 86–297492), XP0002039751 & SU 1219195A (Elektrotyazhkhimpro), Mar. 23, 1986—Abstract.

* cited by examiner

APPARATUS FOR CONTINUOUSLY ROLLING STEEL BILLETS

This is a Division of application Ser. No. 09/511,086 filed Feb. 23, 2000 now U.S. Pat. No. 6,273,324 issued Aug. 14, 2001, which is a Division of application Ser. No. 08/876,651 filed on Jun. 16, 1997, now U.S. Pat. No. 6,089,441 issued Jul. 18, 2000.

BACKGROUND OF THE INVENTION

1. Field of the Invention

The present invention relates to a method for continuous rolling by continuously welding the rolled materials at an intermediate stage of a rolling line after applying several passes of rolling of billets, and relates to an apparatus therefor.

2. Description of the Related Art

A known continuous rolling method to produce wire, rod, or to shape steel with energy-saving and high efficiency comprises the steps of discharging billets from a heating furnace one at a time, welding the rear end of a preceding billet with the front end of a succeeding billet by a single unit travelling flash-butt welder, removing the burr from the welded portions using a scarfer or the like, heating the thus formed continuous billet to a temperature necessary for rolling in an induction heating furnace, then continuously rolling the continuous billet in a rolling mill group: (disclosed in, for example, unexamined Japanese patent publication No.52-43754 (1977)). Alternatively, there is a continuous rolling method in which billets discharged from a heating furnace are joined together by welding to form a continuous billet, and the continuous billet is heated again in the heating furnace, wherein also a single unit travelling flash-butt welder is used: (disclosed in, for example, examined Japanese patent publication No.52-11722 (1982)).

Shortening the cycle time for treating a single billet is an important issue in the continuous rolling of billets. In this respect, the weight of an ordinary billet is in a range of from 0.5 to 2 ton, and the necessary cycle time to treat a single billet is less than 1 min. to assure a production capacity of 70 to 80 ton/hr or more. Since conventional continuous rolling processes use only one on-line travelling flash-butt welder, as described above, the welding time inherent to the travelling flash-butt welder is difficult to shorten. Consequently, it is impossible to realize a cycle time of less than 1 min. in the prior art.

A possible method to shorten the time cycle is to incorporate two travelling welder units to realize a shorter cycle time operation. However, a system of two travelling welders increases investment cost and requires large capacity of power source. Another possible method is to reduce the cross sectional area of the billet through rolling in a specific number of rolling mill groups, to provide the intermediate rolled materials in a free state, to adjust the position of the intermediate rolled materials, and to perform the weld-joining to reduce the welding time. These methods, however, have a disadvantage that, when the intermediate rolled materials become long, the methods cannot be adopted-owing to the limitation of interstand distance:

SUMMARY OF THE INVENTION

An object of the present invention is to provide a method of continuous rolling which shortens the cycle time of billet treatment without requesting a large-scale modification of existing facilities, and to provide an apparatus therefor.

The first method for continuous rolling comprises the steps of: successively rolling a plurality of materials by a first rolling mill group; pinching a succeeding material after being rolled in the first rolling mill group by a set of pinch rolls, detecting the transfer speed of the succeeding material and the position of a front end thereof, and detecting the transfer speed of a preceding material and the position of a rear end thereof; controlling the transfer speed of the succeeding material by adjusting the rotational speed of the pinch rolls so as the front end of the succeeding material to contact with the rear end of the preceding material at a specified position in a travelling welder; after the front end of the succeeding material contacted with the rear end of the preceding material, joining the rear end of the preceding material with the front end of the succeeding material by flash-butt welding using the travelling welder to form a continuous material while letting the travelling welder move at a speed synchronous with the transfer speed of the continuous material; removing burr from a welded section on the continuous material; and continuously rolling the continuous material, after removing the burr, by a second rolling mill group located at downstream side from the burr-removing step.

The first apparatus of continuous rolling comprises: a first rolling mill group for successively rolling a plurality of materials; a travelling welder for joining a rear end of a preceding material with a front end of a succeeding material by flash-butt welding to form a continuous material while moving itself at a speed synchronous with the transfer speed of the materials; a travelling burr-removing machine for removing burr from a welded portion of the continuous material; a second rolling mill group located at down-stream side of the travelling burr-removing machine for continuously rolling the continuous material after removing the burr; wherein the travelling welder, the travelling burr-removing machine, and the second rolling mill group are in linear arrangement.

The second method for continuous rolling comprises the steps of: successively rolling a plurality of materials by a first rolling mill group; pinching a succeeding material after being rolled in the first rolling mill group by a set of pinch rolls, controlling the transfer speed of the succeeding material and the position of a front end thereof, and detecting the transfer speed of a preceding material and the position of a rear end thereof; controlling the transfer speed of the succeeding material by adjusting the rotational speed of the pinch rolls so as the front end of the succeeding material to contact with the rear end of the preceding material at a specified position in a travelling welder; after the front end of the succeeding material contacted with the rear end of the preceding material, joining the rear end of the preceding material with the front end of the succeeding material by flash-butt welding using the travelling welder to form a continuous material while letting the travelling welder move at a speed synchronous with the transfer speed of the continuous material; grinding a welded section on the continuous material to remove burr therefrom; and continuously rolling the continuous material, after removing the burr, by a second rolling mill group located at downstream side from the burr-removing step.

The second apparatus for continuous rolling comprises: a first rolling mill group for successively rolling a plurality of materials; a set of pinch rolls for pinching a succeeding material after being rolled and for detecting the transfer speed of the pinched material; a front end detector located at inlet of the pinch rolls for detecting a front end of the succeeding material; a measuring roll for detecting the transfer speed of a preceding material which is transferred before the succeeding material; a rear end detector located at inlet of the measuring roll for detecting a rear end of the preceding material; a travelling welder located at down-stream side of the measuring roll for joining the rear end of the preceding material with the front end of the succeeding material by flash-butt welding to form a continuous material while moving itself at a speed synchronous with the transfer speed of the continuous material; a travelling burr-removing machine for removing burr from a welded portion of the continuous material; a secondary rolling mill group located at down-stream side of the travelling burr-removing machine for continuously rolling the continuous material after removing the burr; and a drive control unit to which signals from the pinch rolls, the front end detector, the measuring roll, and the rear end detector are entered, and in which the rotational speed of the pinch rolls or both the rotational speed of the pinch roll and the rolling speed of the first rolling mill group are determined so as to enable the front end of the succeeding material to contact with the rear end of the preceding material at a specified position in a travelling welder, and these determined variables are controlled; wherein the pinch rolls, the measuring roll, the travelling welder, the travelling burr-removing machine, and the second rolling mill group are in linear arrangement.

DESCRIPTION OF THE PREFERRED EMBODIMENT

Figure 1:
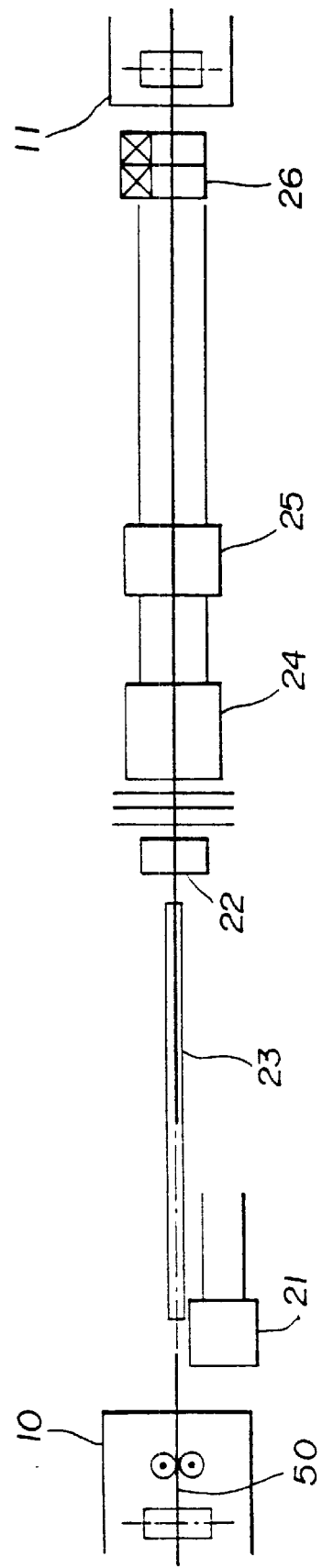
FIG. 1 illustrates the continuous rolling apparatus in the first mode according to the present invention.

1. The First Mode:

FIG. 1 illustrates the apparatus for continuous rolling of a mode according to the present invention. The figure shows a fourth-stand 10 and a fifth stand 11 in the rolling mill group. The first stand (not shown) through the fourth stand 10 are assumed to form the roughing mill group, and the fifth stand 11 and succeeding stands are assumed to form the intermediate rolling stands. Between the fourth stand 10 and the fifth stand 11, there are serially arranged a travelling hot saw 21, a descaler 22, a table 23, a travelling flash-butt welder 24 (hereinafter referred to simply as the "travelling welder"), a travelling burr-removing machine 25, and a travelling induction heating unit 26.

The following is the description of the functioning state of the apparatus of FIG. 1. A material 50 leaves the fourth stand 10 and enters the travelling hot saw 21 where the front end thereof is crop-cut. The crop-cutting is done to obtain a suitable shape (or existence of no significant collapse at its edge) for succeeding flash-butt welding (FBW). Even when a travelling cutting machine is applied instead of the hot saw, the cutting machine minimizes the collapse of material. The material 50 after passing the fourth stand 10 becomes free. Then the material 50 is sent by the table 23 to catch up with the rear end of the preceding material when the rear end arrives at the center of home position of the travelling welder 24. The descaler 22 located at the inlet of the travelling welder 24 and removes scale at the clamped portions on front end and rear end of the transferred materials. The travelling burr-removing machine 25 is located after the moving end of the travelling welder 24. The travelling burr-removing machine 25 conducts burr-removal at the welded portion of the materials welded by the travelling welder 24 while moving. The materials welded by the travelling welder 24 are cooled at their clamped portions during welding. The travelling induction heating unit 26 located at inlet of the fifth stand 11 heats the cooled portions, then the travelling induction heating unit 26 sends the materials to the fifth stand 11.

The cut of the material at its rear end is conducted at a point that the rear end passes through the home position of the travelling hot saw 21. At that moment, if the material is in a completely free state (or in a state that the material passed through the fourth stand and that the material is not clamped by the travelling welder 24), then the cutting in a stopped state is also possible.

Figure 2:
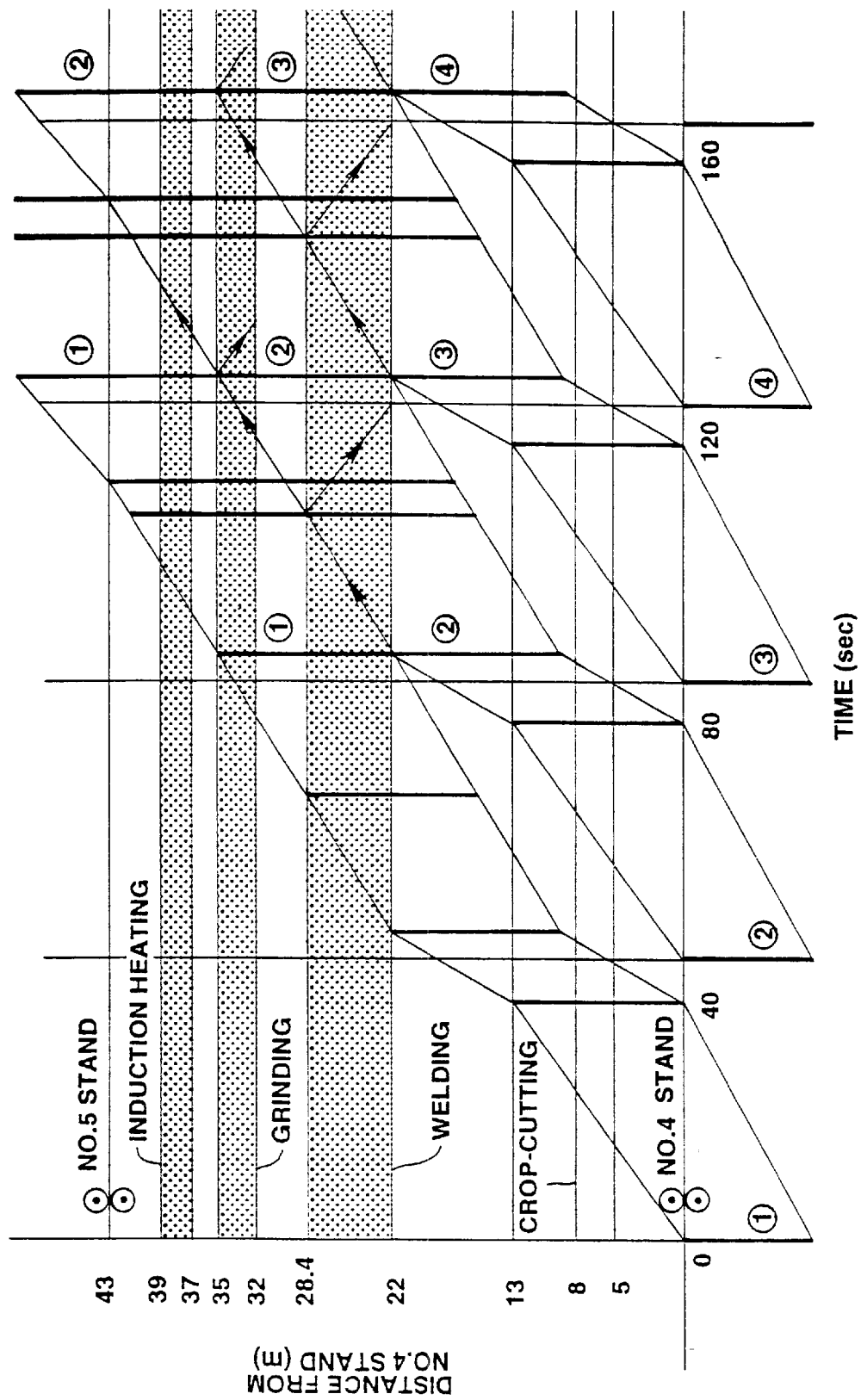
FIG. 2 is a time chart of motion of the continuous rolling apparatus in the first mode according to the present invention.

FIG. 2 is a time chart illustrating an example of motion of continuous rolling apparatus of FIG. 1. For example, the material (2) discharged from the fourth stand 10 is crop-cut at its front end by the travelling hot saw 21. At that moment, the material (2) is still caught by the fourth stand 10, so the travelling hot saw 21 conducts the cutting action while moving at a speed synchronous with the transfer speed of the rolled material. When the material (2) is passed through the fourth stand 10, the table 23 feeds the material (2) so that the front end thereof catches up with the rear end of the preceding material (1) at a point that the rear end of the preceding material (1) arrives at the center of the waiting position in the travelling welder 24. During the feeding period, the rear end of the material (2) passes through the travelling hot saw 21 so that the rear end of the material (2) is cut. The cutting of the rear end of the material (2) may be conducted while moving thereof. Since, however, during the moving period, the material (2) is in a free state, the cutting may be done by stopping the movement of the material and may be done in a stopped state, if only the cycle time allows.

The travelling welder 24 begins to move at a point when the front end of the succeeding material (2) catches up with the rear end of the preceding material (1), and conducts flash-butt welding (FBW) after clamping materials (1) and (2) together. According to the chart of FIG. 2, the rolling cycle of each billet is selected to 40 sec. including 20 sec. for welding and 18 sec. for returning. Since the material being treated in this step is an intermediate material, the cross sectional area of the material is narrower than that of the billet (about one fourth after the fourth stand), and the welding time is short. After completing the welding step, the travelling burr-removing machine 25 conducts burr-removal while moving. FIG. 2 shows a burr-removal cycle of 12 sec. including 6 sec. for burr-removal and 6 sec. for returning.

The travelling induction heating unit 26 located at the inlet of the fifth stand 11 conducts heating and soaking of the materials. Since, however, the time for the material to leave the fourth stand 11 and enter the fifth stand is 120 sec. or less, and since there is not significant temperature reduction, heating and soaking of the locally cooled portion at clamped portions are important. In this respect, it is effective that the induction heating unit 26 is also a travelling type, if space allows.

Figure 3:
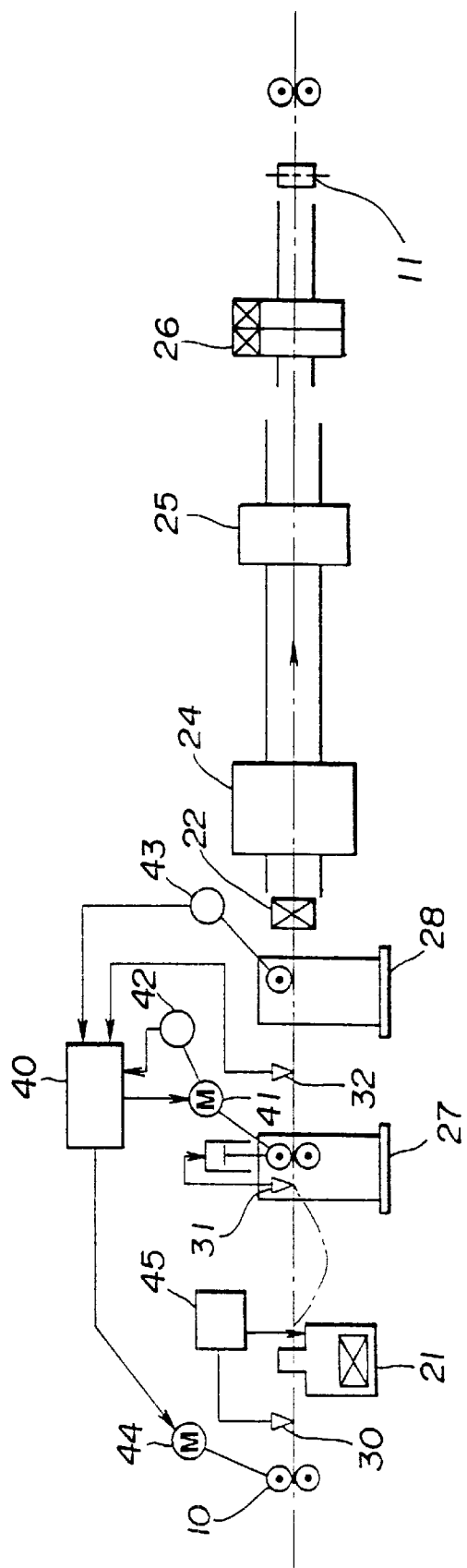
FIG. 3 illustrates the continuous rolling apparatus in the second mode according to the present invention.

2. The Second Mode:

FIG. 3 illustrates the apparatus for continuous rolling of a mode according to the present invention. The figure shows a fourth stand 10 and a fifth stand 11 in the rolling mill group. The first stand (not shown) through the fourth stand 10 are assumed to form the rough roll group. A travelling cutting machine 21 is located at the upstream side of the exit of the fourth stand 10. A set of pinch rolls 27 which is controllable in the driving speed thereof is located at the downstream side of the travelling cutting machine 21. A measuring roll 28, a descaler 22, a travelling flash-butt welder 24 (hereinafter referred to simply as "travelling welder"), and a travelling burr-removing machine 25 are arranged in series at the downstream side of the pinch rolls 27. A travelling induction heating unit 26 is located at the inlet of the fifth stand 11. Since the mode has a short distance between stands, very little temperature reduction of the material occurs and, therefore, no stationary induction heating unit for heating the material is required.

At the inlet of the travelling cutting machine 21, the pinch rolls 27, and the measuring roll 28, a respective material detector 30, 31, and 32, is positioned. The detector 30 detects the front end and the rear end of material, and the detection signal generated by the detector 30 is used to control the movement of the travelling cutting machine 21. The detector 31 detects the front end of the material, and the detector 32 detects the rear end of the material. The drive control unit 40 receives the detection signals generated by the detector 32, the rotary encoder 42 attached to the drive motor 41 which drives the pinch rolls 27, and the rotary encoder 43 attached to the measuring roll 28, and controls the drive motor 44 of the fourth stand 10 and the drive motor of the pinch rolls 27 based on the received detection signals. The drive control unit 45 receives the detection signal generated by the detector 30 to control the travelling cutting machine 21.

The following is the description of a functioning state of the apparatus of FIG. 3. A material rolled in the fourth stand 10 arrives at the detector 30 where the arrival of the front end of the material is detected. The drive control unit 45 drives the travelling cutting machine 21 based on the detection signal to conduct crop-cutting of the front end of the material. When the detector 30 detects the rear end of a material, the travelling cutting machine 21 is controlled for its movement in a similar manner to conduct crop-cutting of the rear end of the material. The cutting is done to obtain a suitable shape (or existence of no significant collapse at its edge) for succeeding flash-butt welding (FBW). Accordingly, the travelling cutting machine 21 is requested to be the one that generates very little collapse at the cutting edge. A travelling saw may be applied as the travelling cutting machine 21. The material which was crop-cut at its end in the travelling cutting machine 21 then arrives at the detector 31 where the arrival of the front end thereof is detected. On arrival of the front end of the material at the detector 31, the material is pinched by the pinch rolls 27 at a slightly rear side from the front end thereof.

The speed of the material at that moment at the exit of fourth stand 10 is set to a slightly higher value than the inlet speed of the continuous material to the fifth stand 11 (determined by therotary encoder 43 in the measuring roll 28), and the pinch rolls 27 are also driven synchronously with the speed of the material.

After the succeeding material is pinched by the pinch rolls 27, the transfer speed and the front position of the succeeding material are detected by the pinch rolls 27. That is, the transfer speed of the material is detected by the rotary encoder 42, and the front end of the material is detected by the detector 31, thereby tracking the movement of the material using a drive control unit 40 to detect the transfer speed and the front end position of the succeeding material. As for the preceding material, the transfer speed is detected by the rotary encoder 43 in the measuring roll 28, and the rear end position is detected by the detector 32, thus tracking the movement of the preceding material using the drive control unit 40 to detect the transfer speed and the front end position of the succeeding material. The drive control unit 40 computes the transfer speed of upstream material so as the front end of the succeeding material and the rear end of the preceding material contact each other at a target position before the travelling welder 24 based on the relative relation between the transfer speed and front end position of succeeding material and the transfer speed and rear end position of preceding material, then controls the rotational speed of the drive motor 44 of the fourth stand 10 and the drive motor 41 of the pinch rolls 27.

Through the control described above, the rear end of preceding material and the front end of succeeding material make contact with each other at a target position. The drive control unit 40 detects the contact of materials from the increased torque (increased drive current) on the pinch rolls 27 or from the thrust force applied to the pinch rolls 27 toward the upstream side, and controls the transfer speed (rolling speed) at the upstream side to synchronize with the rolling speed at the down-stream side. At a moment that the succeeding material and the preceding material arrive at the home position of the travelling welder 24 in a state of adjoining and synchronously running thereof, the travelling welder 24 begins the welding of these materials while moving by itself synchronously with the transfer speed of the materials. The descaler 22 which is located at the inlet of the travelling welder 24 performs descaling at the clamped portion at both the front end and rear end of the transferred material. After the travelling welder 24, there is positioned the travelling burr-removing machine 25 which conducts burr-removal at the portion welded by the travelling welder 24 in a moving mode. The material welded by the travelling welder 24 is cooled at its clamped portion during welding. The induction heating unit 26 located at the inlet of the fifth stand 11, however, heats the locally cooled portion before transferring the material to the fifth stand 11.

According to the above-described welding process, the transfer speed of the succeeding material is controlled against the transfer speed of the preceding material responding to respective welding condition for flash-butt welding and for upset-welding. The control is performed through the control of upset cylinder which is built in the travelling welder 24. The speed control of the upstream (succeeding) material corresponding to the control of the upset-cylinder differs with variables such as billet size, intermediate material size, and distance between the welder and the upstream stand.

1) In the case wherein the rear end of the succeeding material passes through the fourth stand 10 and that the succeeding material becomes free before the welding begins, (or that the succeeding material passed through the fourth stand 10 and the succeeding material is not clamped by the travelling welder 24), the welder clamps the succeeding material, then the pinch rolls 27 release the material. That is, the case occurs for a short intermediate material passed through the fourth stand 10. The case is controlled in a similar procedure as prior art.

2) In the case wherein the cross sectional area of intermediate material is relatively narrow and the length thereof is long, (50 sq. to 100 sq.), the speed variation is absorbed by a material loop height between the fourth stand 10 and the pinch rolls 27. Since the speed variation in that case is slight, the necessary height of material loop is very small (100 to 200 mm), the material loop height is easily formed if only the distance between the fourth stand 10 and the pinch rolls 27 is secured.

3) In the case wherein the cross sectional area of the intermediate material is wide and the length thereof is large, the formation of material loop height is difficult so that the speed control is applied by an integral motion of the fourth stand 10 and of the pinch rolls 27. Since the change cycle of transfer speed of the material is at a level of several Hz, conventional tension control is applicable.

As described above, according to the present invention, materials that were reduced in their cross sectional area by rolling in the first rolling mill group are joined together by flash-butt welding in a travelling welder to form a continuous material, and the burr on the welded portions of the continuous material is removed, followed by continuous rolling of the continuous material in a second rolling mill group. Accordingly, shortening of billet treatment cycle time is realized without requesting significant modification of existing facilities, and a succeeding material rolled in and discharged from the first rolling mill group is pinched by a set of pinch rolls, and the transfer speed and the front end position of the succeeding material are detected, also the transfer speed and the rear end position of the preceding material are detected. Then the transfer speed of the succeeding material is controlled so as the front end of the succeeding material to contact with the rear end of the preceding material at a specified position in a travelling welder through the adjustment of the drive speed of the pinch rolls or both the drive speed of the pinch rolls and the first rolling mill group. Thus, the materials which were reduced in the cross sectional area thereof by rolling are successively welded together by the travelling welder to form a continuous material. As a result, the welding time is shortened, the continuous welding of billets is performed independent of billet size and intermediate material length, and the cycle time for treating billets is shortened. Since the method according to the present invention is not limited by billet size, the method is applicable to a rolling mill group having relatively short distance between both stands.

What is claimed is:

1. An apparatus for continuous rolling comprising:

a first rolling mill group for successively rolling a plurality of steel billets;

a set of pinch rolls for pinching a succeeding steel billet after rolling the plurality of steel billets, and for detecting the transfer speed of the pinched steel billet;

a front end detector positioned at an inlet of the pinch rolls for detecting a front end of the succeeding steel billet;

a measuring roll for detecting the transfer speed of a preceding steel billet which is transferred before the succeeding steel billet;

a rear end detector located at an inlet of the measuring roll for detecting a rear end of the preceding steel billet;

a travelling flash-butt welding machine located downstream from the measuring roll for joining the rear end of the preceding steel billet with the front end of the succeeding steel billet by flash-butt welding to form a continuous steel billet while moving at a speed synchronous with the transfer speed of the continuous steel billet;

a travelling burr-removing machine for removing burr from a welded portion of the continuous steel billet;

a secondary rolling mill group located downstream from the travelling burr-removing machine for continuously rolling the continuous steel billet after removing the burr; and a drive control unit to which signals from the pinch rolls, the front end detector, the measuring roll, and the rear end detector are entered, and in which the rotational speed of the pinch rolls or both the rotational speed of the pinch roll and the rolling speed of the first rolling mill group are determined so that the front end of the succeeding steel billet contacts the rear end of the preceding steel billet at a specified position in the travelling flash-butt welding machine, and these determined variables are controlled, wherein the pinch rolls, the measuring roll, the travelling flash-butt welding machine, the travelling burr-removing machine, and the second rolling mill group are arranged in a linear arrangement.

2. The apparatus of claim 1 further comprising:

a front/rear detector located at an exit of the first rolling mill group for detecting the front end and the rear end of steel billets discharged from the first rolling mill group; and a crop-cutter interposed between the front/rear end detector and the pinch rolls for crop-cutting the front end of the succeeding steel billet and the rear end of the preceding steel billet while moving by itself.

3. The apparatus of claim 2, further comprising a travelling induction heating unit located at an inlet of the second rolling mill group.

4. The apparatus of claim 1, further comprising a travelling induction heating unit located at an inlet of the second rolling mill group.

* * * * *